US009046393B2

(12) United States Patent
Yang et al.

(10) Patent No.: US 9,046,393 B2
(45) Date of Patent: Jun. 2, 2015

(54) METHOD FOR MEASURING REMAINING HYDROGEN CAPACITY OF HYDROGEN STORAGE CANISTER INCORPORATING RFID DEVICE

(75) Inventors: Jefferson YS Yang, Orange, CA (US); Feng-Hsiang Hsiao, Taipei (TW); Hong-Shi Chang, Miaoli County (TW); Chih-Hsueh Chen, Miaoli County (TW)

(73) Assignee: ASIA PACIFIC FUEL CELL TECHNOLOGIES, LTD., Miaoli County (TW)

(*) Notice: Subject to any disclaimer, the term of this patent is extended or adjusted under 35 U.S.C. 154(b) by 643 days.

(21) Appl. No.: 12/975,942

(22) Filed: Dec. 22, 2010

(65) Prior Publication Data

US 2011/0227742 A1 Sep. 22, 2011

(30) Foreign Application Priority Data

Dec. 25, 2009 (TW) ................................. 98144996 A

(51) Int. Cl.
| | |
|---|---|
| G08B 21/00 | (2006.01) |
| G01F 9/00 | (2006.01) |
| G01F 13/00 | (2006.01) |
| G01F 23/18 | (2006.01) |
| H01M 8/04 | (2006.01) |

(52) U.S. Cl.
CPC .............. *G01F 9/001* (2013.01); *G01F 13/006* (2013.01); *G01F 23/18* (2013.01); *G01F 23/185* (2013.01); *H01M 8/04216* (2013.01); *H01M 8/04776* (2013.01); *H01M 2250/20* (2013.01); *Y02E 60/321* (2013.01); *Y02E 60/50* (2013.01); *Y02T 90/32* (2013.01)

(58) Field of Classification Search
CPC ....... Y02T 90/32; Y02E 60/50; Y02E 60/321; G01F 23/18; G01F 9/001; G01F 13/006; G01F 23/185; H01M 8/04776; H01M 2250/20; H01M 8/04216
USPC ........................ 340/614, 636.19; 429/19, 416
See application file for complete search history.

(56) References Cited

U.S. PATENT DOCUMENTS

| | | | |
|---|---|---|---|
| 2005/0118468 A1 | 6/2005 | Adams et al. | |
| 2008/0026269 A1* | 1/2008 | Shurtleff et al. | ................. 429/19 |
| 2009/0233132 A1* | 9/2009 | Hasuka et al. | ................... 429/25 |

(Continued)

FOREIGN PATENT DOCUMENTS

| | | |
|---|---|---|
| CN | 1854692 | 11/2006 |
| JP | H0293733 U | 7/1990 |

(Continued)

*Primary Examiner* — Tai T Nguyen
*Assistant Examiner* — Ojiako Nwugo
(74) *Attorney, Agent, or Firm* — Kirton McConkie; Evan R. Witt

(57) ABSTRACT

A method is provided for measuring remaining hydrogen capacity of hydrogen storage canister incorporating tag information. An information identification tag is attached to a hydrogen storage canister. The information identification tag contains therein at least one record of tag information indicating the hydrogen storage quantity of the hydrogen storage canister. Once the hydrogen storage quantity is read from the tag information of the information identification tag and hydrogen consumption quantity supplied from the hydrogen storage canister is detected, the hydrogen storage quantity is operated by subtracting the hydrogen consumption quantity therefrom to calculate a hydrogen residue, which is then used to update the tag information of the information identification tag or is stored for subsequent use.

12 Claims, 14 Drawing Sheets

(56) References Cited

U.S. PATENT DOCUMENTS

2010/0012219 A1* 1/2010 Shibukawa et al. .............. 141/4
2010/0248060 A1* 9/2010 Bono ............................ 429/443
2010/0278722 A1* 11/2010 Field .......................... 423/648.1

FOREIGN PATENT DOCUMENTS

| | | |
|---|---|---|
| JP | 2005347040 | 12/2005 |
| JP | 2009021041 | 1/2009 |
| WO | 2007019208 | 2/2007 |

* cited by examiner

| FIG.7A |
|---|
| FIG.7B |

FIG.7

METHOD FOR MEASURING REMAINING HYDROGEN CAPACITY OF HYDROGEN STORAGE CANISTER INCORPORATING RFID DEVICE

FIELD OF THE INVENTION

The present invention relates to a method for measuring hydrogen residue in a hydrogen storage canister, and in particular to a method for measuring remaining hydrogen capacity of hydrogen storage canister incorporating RFID device.

BACKGROUND OF THE INVENTION

Both a hydrogen fuel cell system and an application device powered by hydrogen fuel cells require a proper supply of hydrogen. Hydrogen storage is commonly categorized as pressurized hydrogen, liquid hydrogen, and hydrogen storage alloy, among which pressurized hydrogen is of high energy, high weight, and high density but is also high in volume and poor in safety. Liquid hydrogen is also of high energy, high weight, and high density, but a large consumption of energy is required for liquefaction of hydrogen, and must be stored in a thermal insulation tank. This makes the liquid hydrogen fit for storage in a large-sized tank. For general applications, hydrogen storage alloy is a practical solution, which uses a canister to serve as a storage container for storage of hydrogen.

SUMMARY OF THE INVENTION

When hydrogen is supplied from a hydrogen storage canister to for example a transportation that is powered by a hydrogen storage canister, a stationary fuel cell power generator operated by a hydrogen storage canister, or other hydrogen storage canister operated application devices, it often needs to detect and monitor hydrogen residue remaining in the hydrogen storage canister before recharging of hydrogen to the canister or replacing the canister can be made. The state-of-the-art techniques are advanced enough to allow for fast, convenient and timely detection of hydrogen residue in a canister. This makes it hard to for example commercialize and popularize fuel cell systems and application systems of fuel cell, such as fuel cell powered electrical vehicles.

Thus, an objective of the present invention is to provide a method for measuring remaining hydrogen capacity of hydrogen storage canister by applying tag information, which allows for immediate detection of hydrogen residue in a hydrogen storage canister for stationary and portable electrical power supply systems, transportations, and other application devices, so as to enhance convenience of use and replacement of hydrogen storage canister in application devices.

The solution adopted in the present invention to overcome the problems of the conventional techniques comprises combining an information identification tag to a hydrogen storage canister, wherein the information identification tag contains therein at least one record of RFID device indicating the hydrogen storage quantity of the hydrogen storage canister. Once the hydrogen storage quantity is read from the tag information of the information identification tag and hydrogen consumption quantity supplied from the hydrogen storage canister is detected, the hydrogen storage quantity is operated by subtracting the hydrogen consumption quantity therefrom to calculate a hydrogen residue, which is then used to update the tag information of the information identification tag or is stored for subsequent use.

With the technical solution provided by the present invention, the hydrogen storage quantity of a hydrogen storage canister can be readily and efficiently retrieved from the information identification tag, whereby the residual hydrogen quantity remaining in the hydrogen storage canister can be obtained or calculated and through proper updating of the tag information contained in the information identification tag or storing the residual hydrogen quantity so obtained or calculated, it is possible to identify the current residue of hydrogen remaining in the canister. This makes it possible to timely identify the current condition of a hydrogen storage canister for use in various applications, including for example stationary and portable electrical power supply systems and transportations.

BRIEF DESCRIPTION OF THE DRAWINGS

The present invention will be apparent to those skilled in the art by reading the following description of the best modes for carrying out the present invention, with reference to the attached drawings, in which.

DETAILED DESCRIPTION OF THE PREFERRED EMBODIMENTS

Figure 1:
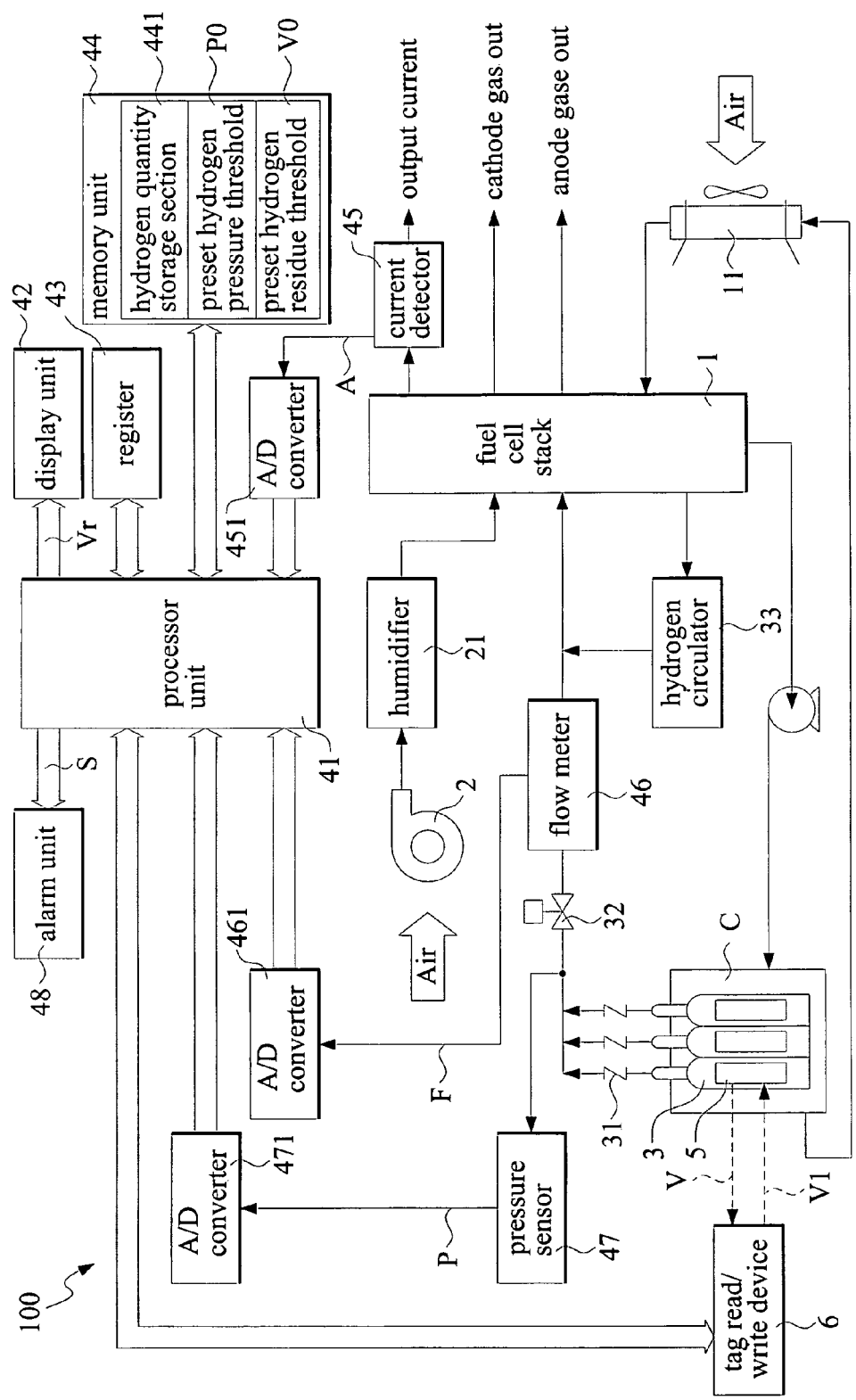
FIG. 1 is a system block diagram of the present invention.
Figure 2:
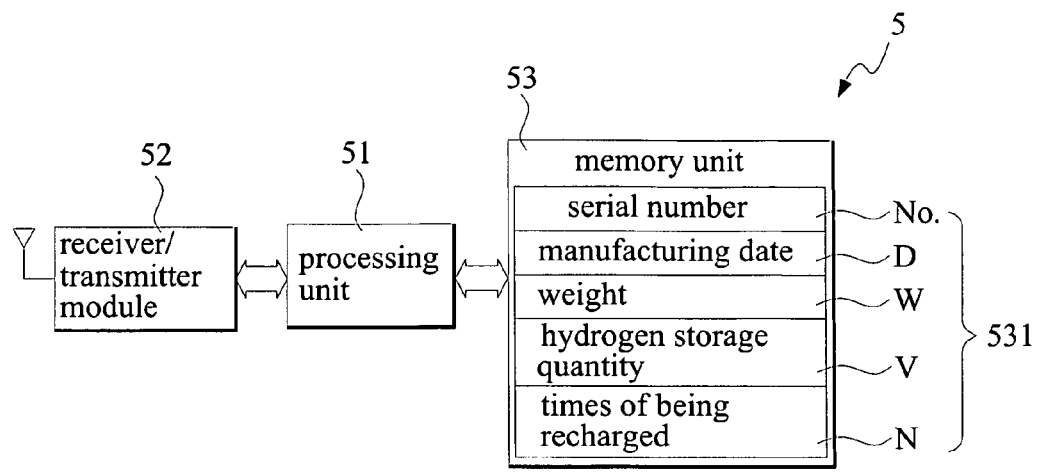
FIG. 2 is circuit block diagram of an information identification tag used in the present invention.

With reference to the drawings and in particular to FIGS. 1 and 2, which are respectively a system block diagram of the present invention and a circuit block diagram of an information identification tag used in the present invention, an application device (not shown) comprises a fuel cell system 100 that comprises a fuel cell stack 1, which generates, through an electrochemical reaction between hydrogen and air, an electrical current applied to a load (not shown). The fuel cell stack 1 is combined with a heat exchanger 11 for heat dissipation of the reaction thereof.

During the reaction, the fuel cell stack 1 receives a cathode gas (which in the instant embodiment is air) supplied from an air supply source 2 and subjected to humidity regulation by a humidifier 21 before supplied to the fuel cell stack 1. During the reaction, the fuel cell stack 1 also receives an anode gas (which is the instant embodiment is hydrogen) supplied from a hydrogen storage canister 3 and conveyed through a fast connector 31 and a flow regulation valve 32 to the fuel cell stack 1. Hydrogen is cyclically circulated through the fuel cell stack 1 by a hydrogen circulator 33.

The fuel cell system 100 comprises a control circuit, which comprises a processor unit 41, a display unit 42, a register 43, a memory unit 44, a current detector 45, a flow meter 46, a pressure sensor 47, and an alarm unit 48.

The display unit 42, the register 43, the memory unit 44, and the alarm unit 48 are electrically connected to the processor unit 41. The memory unit 44 contains a hydrogen quantity storage section 441, a preset hydrogen pressure threshold P0 and a preset hydrogen residue threshold V0. In the instant embodiment, the alarm unit 48 comprises an alarm light or a buzzer.

The current detector 45 is connected through an analog-to-digital converter 451 to the processor unit 41 to detect an output current A generated by the reaction occurring in the fuel cell stack 1. The flow meter 46 is connected through an analog-to-digital converter 461 to the processor unit 41 to detect a hydrogen flow rate F supplied from the hydrogen storage canister 3 to the fuel cell stack 1. The pressure sensor 47 is connected through an analog-to-digital converter 471 to the processor unit 41 to detect a hydrogen storage pressure P of the hydrogen stored in the hydrogen storage canister 3.

The hydrogen storage canister 3 is provided with an information identification tag 5, which is a readable and writable tag. In the instant embodiment, the information identification tag 5 comprises a radio frequency identification (RFID) tag, which comprises a processing unit 51, a radio frequency receiver/transmitter module 52, and a memory unit 53. The memory unit 53 stores therein at least one record of tag information 531 indicating a hydrogen storage quantity V of the quantity of hydrogen currently stored in the hydrogen storage canister 3, and contains other information including serial number (No.), manufacturing date (D), weight (W), times of being recharged (N) of the hydrogen storage canister. The tag information 531 of the information identification tag 5 can be read and written by a tag read/write device 6 serving as a RFID device, which in the instant embodiment comprises an RFID read/write device.

Figure 3:
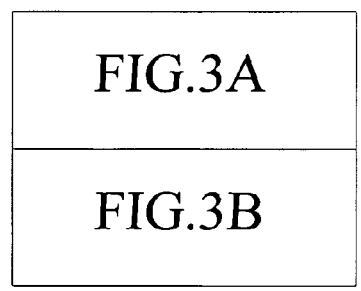
FIG. 3 shows a flow chart of a method according to a first operation mode of the present invention.
Figure 3A:
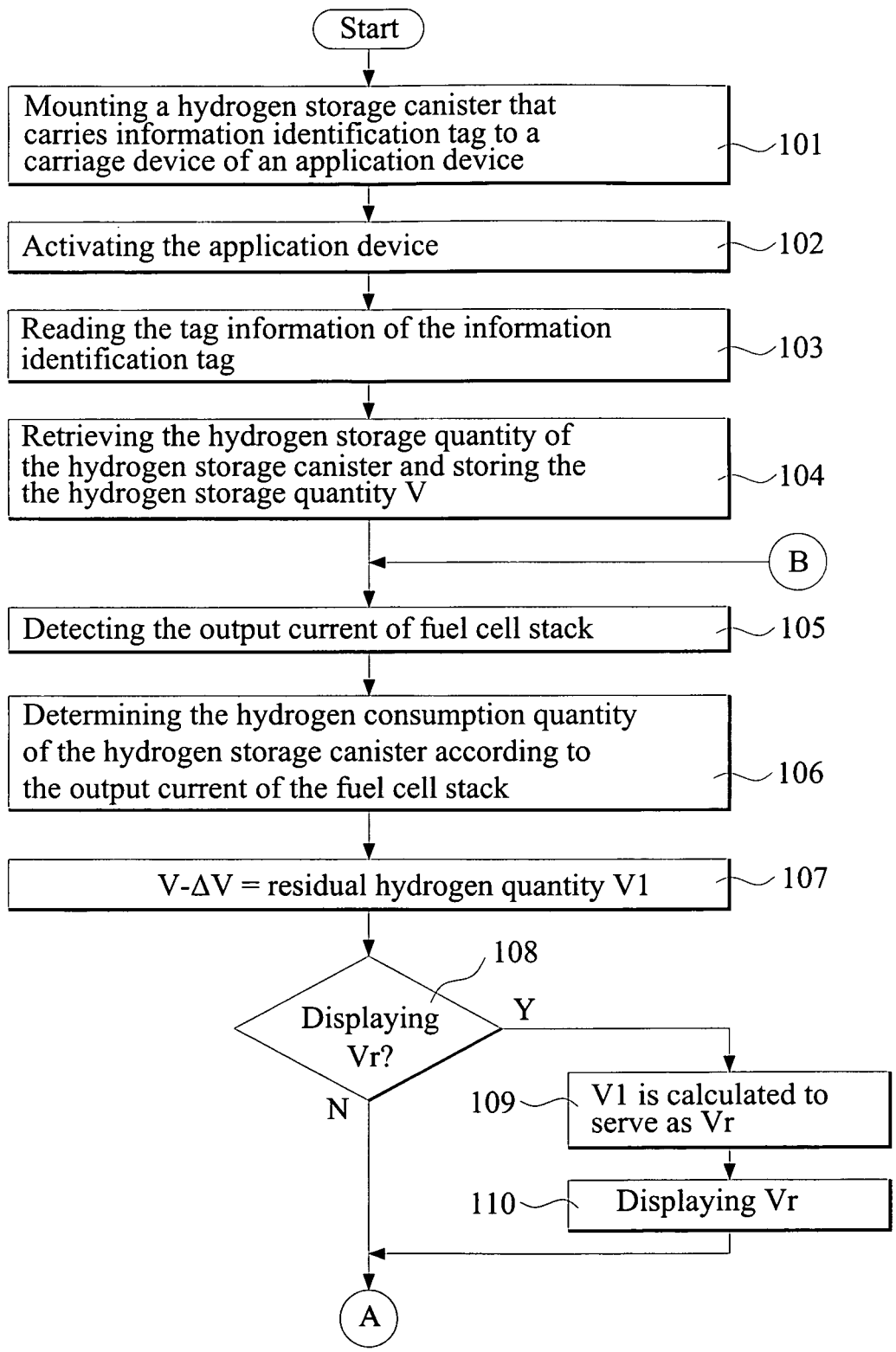
Figure 3B:
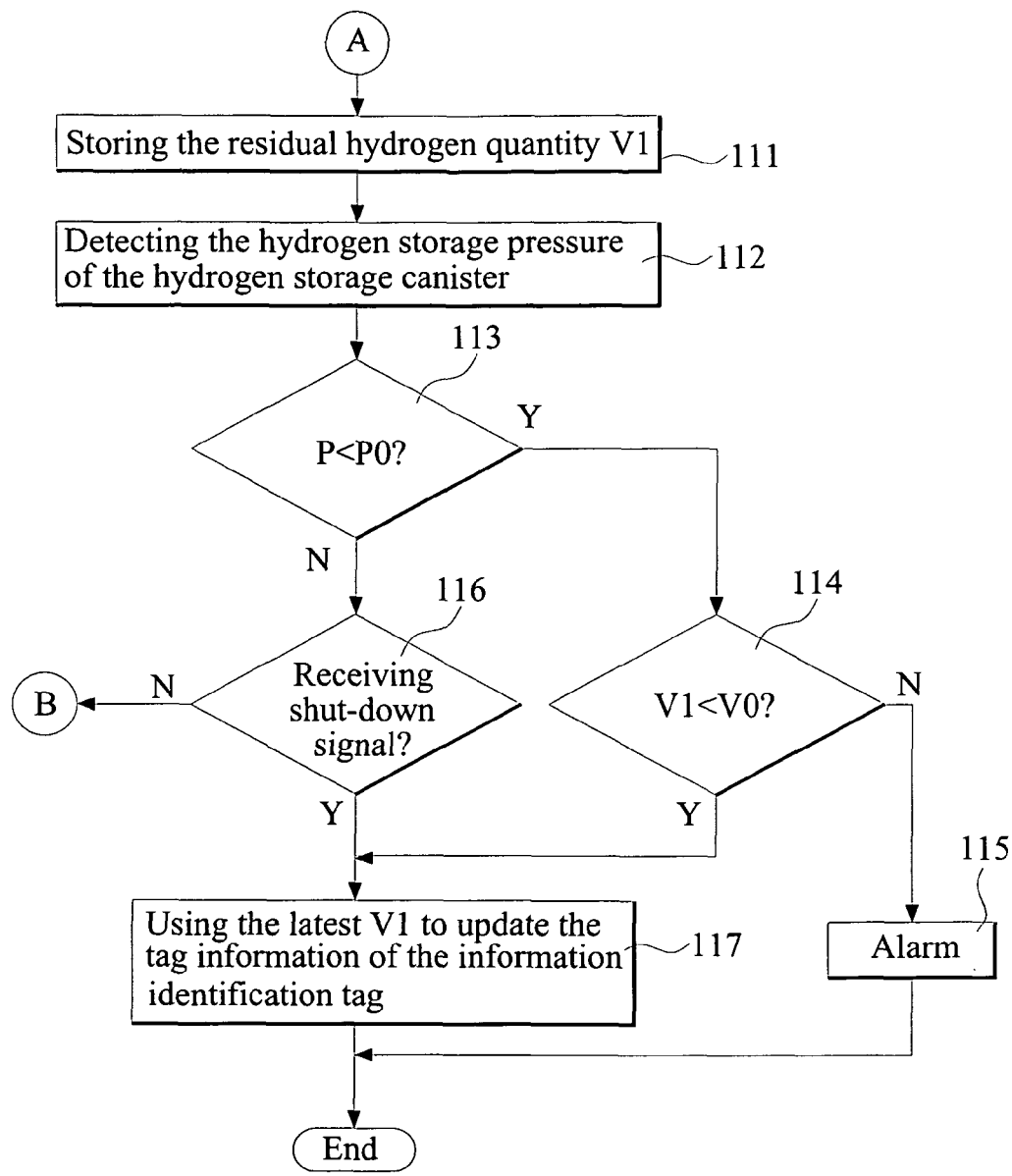

Referring to FIG. 3, which shows a flow chart of a method according to a first operation mode of the present invention, reference being also made to FIGS. 1 and 2, a hydrogen storage canister 3 that carries an information identification tag 5 is first mounted to a carriage device C of an application device (Step 101). Examples of the application device include devices that powered by hydrogen storage canisters 3, such as stationary and portable electrical power supply devices (such as fuel cell power generator) and transportation vehicles (such as electrical motorcycles and electrical automobiles).

After the hydrogen storage canister 3 is completely mounted, the application device is activated (Step 102) to put the fuel cell system 100 of the application device into operation and the hydrogen storage canister 3 starting supply of hydrogen to the fuel cell stack 1. Then, the tag read/write device 6 reads the tag information 531 from the memory unit 53 of the information identification tag 5 (Step 103) to retrieve the hydrogen storage quantity V of the hydrogen storage canister 3 and stores the hydrogen storage quantity V to the hydrogen quantity storage section 441 of the memory unit 44 (Step 104).

Next, acquirement is made for the hydrogen consumption quantity $\Delta V$ supplied from the hydrogen storage canister 3. Since the electrical current supplied by the reaction of the fuel cell stack 1 is substantially proportional to the supply of hydrogen from the hydrogen storage canister 3, in the instant embodiment, the output current A generated by the reaction occurring in the fuel cell stack 1 is first detected by the current detector 45 (Step 105), and the output current A is then applied through the analog-to-digital converter 451 to the processor unit 41 to allow the processor unit 41 to make an operation on the output current A of the fuel cell stack 1 to determine the hydrogen consumption quantity $\Delta V$ of the hydrogen storage canister 3 (Step 106). Afterwards, the processor unit 41 subtracts the hydrogen consumption quantity $\Delta V$ from the hydrogen storage quantity V, which is previously retrieved, to obtain the residual hydrogen quantity V1 that currently remains in the hydrogen storage canister 3 (Step 107).

The residual hydrogen quantity V1 and/or the hydrogen storage quantity V of the hydrogen storage canister 3 can be displayed or shown in various ways. In the instant embodiment, a user may determine if to a residual hydrogen percentage Vr of the hydrogen storage canister 3 (Step 108). In other words, percentage of the residual hydrogen quantity V1 is calculated to serve as the residual hydrogen percentage Vr (Step 109), and then the processor unit 41 applies the residual hydrogen percentage Vr so calculated to the display unit 42 to be displayed thereon (Step 110).

Once the residual hydrogen quantity V1 is determined, the residual hydrogen quantity V1 is stored back to the hydrogen quantity storage section 441 of the memory unit 44 (Step 111). In other words, the residual hydrogen quantity V1 (which indicates the hydrogen storage quantity currently remaining in the canister) is used to replace the hydrogen storage quantity V that was previously retrieved from the information identification tag 5.

With the residual hydrogen quantity V1 determined by the operation of the above steps, the pressure sensor 47 detects the hydrogen storage pressure P of the hydrogen storage canister 3 (Step 112), which is then applied through the analog-to-digital converter 471 to the processor unit 41. The processor unit 41 makes a comparison of the hydrogen storage pressure P with the hydrogen pressure threshold P0 stored in the memory unit 44 to determine if the hydrogen storage pressure P is lower than the hydrogen pressure threshold P0 (Step 113).

The hydrogen storage pressure P of the hydrogen storage canister 3 varies with the decrease of hydrogen contained in the hydrogen storage canister 3, but generally not in proportion thereto. Thus, it is generally hard to directly calculate the residual hydrogen quantity V1 from the hydrogen storage pressure P. It is only when the hydrogen contained in the hydrogen storage canister 3 gets almost exhausted that the hydrogen storage pressure P becomes clearly lower than the hydrogen pressure threshold P0, which may thus be feasible for determination of the run-out of hydrogen of the hydrogen storage canister 3.

Therefore, when the hydrogen storage pressure P is clearly lower than the hydrogen pressure threshold P0, it indicates that the canister almost runs out of hydrogen. Based on such a condition, the processor unit 41 may correctly determine if the residual hydrogen quantity V1 is actually lower than the hydrogen residue threshold V0 (Step 114) and confirmation of correctness of the calculation of the residual hydrogen quantity V1 can be made. With the confirmation so made, abnormal situations, such as leakage occurring in the hydrogen storage canister 3, malfunctioning of control system, and other unexpected failure problems, can be identified.

If it is found that the calculated residual hydrogen quantity V1 is higher than the hydrogen residue threshold V0, then it indicates that the calculated residual hydrogen quantity V1 does not match the confirmation made with respect to the result of pressure detection. This may be caused by leakage of the hydrogen storage canister 3 or malfunctioning of control system or other unexpected failure problems and under this condition, the processor unit 41 supplies a control signal S to the alarm unit 48, making the alarm unit 48 issue an alarm signal to notify the user (Step 115). In the instant embodiment, the alarm unit 48 comprises a light alarm, which when actuated, flashes to notify the user.

In case that the hydrogen storage pressure P is higher than the hydrogen pressure threshold P0, the processor unit 41 will determine if a shut-down signal is received (Step 116). If not, re-detection of the output current A of the fuel cell stack is repeatedly made to timely determine the consumption of hydrogen of the hydrogen storage canister 3. In case that a shut-down signal is received, the processor unit 41 transmits the calculated residual hydrogen quantity V1 to the tag read/write device 6, and the tag read/write device 6 uses the latest residual hydrogen quantity V1 to update the tag information 531 of the information identification tag 5 (Step 117) in order to keep the latest residual hydrogen quantity V1 in the information identification tag 5 for subsequent use.

Figure 4A:
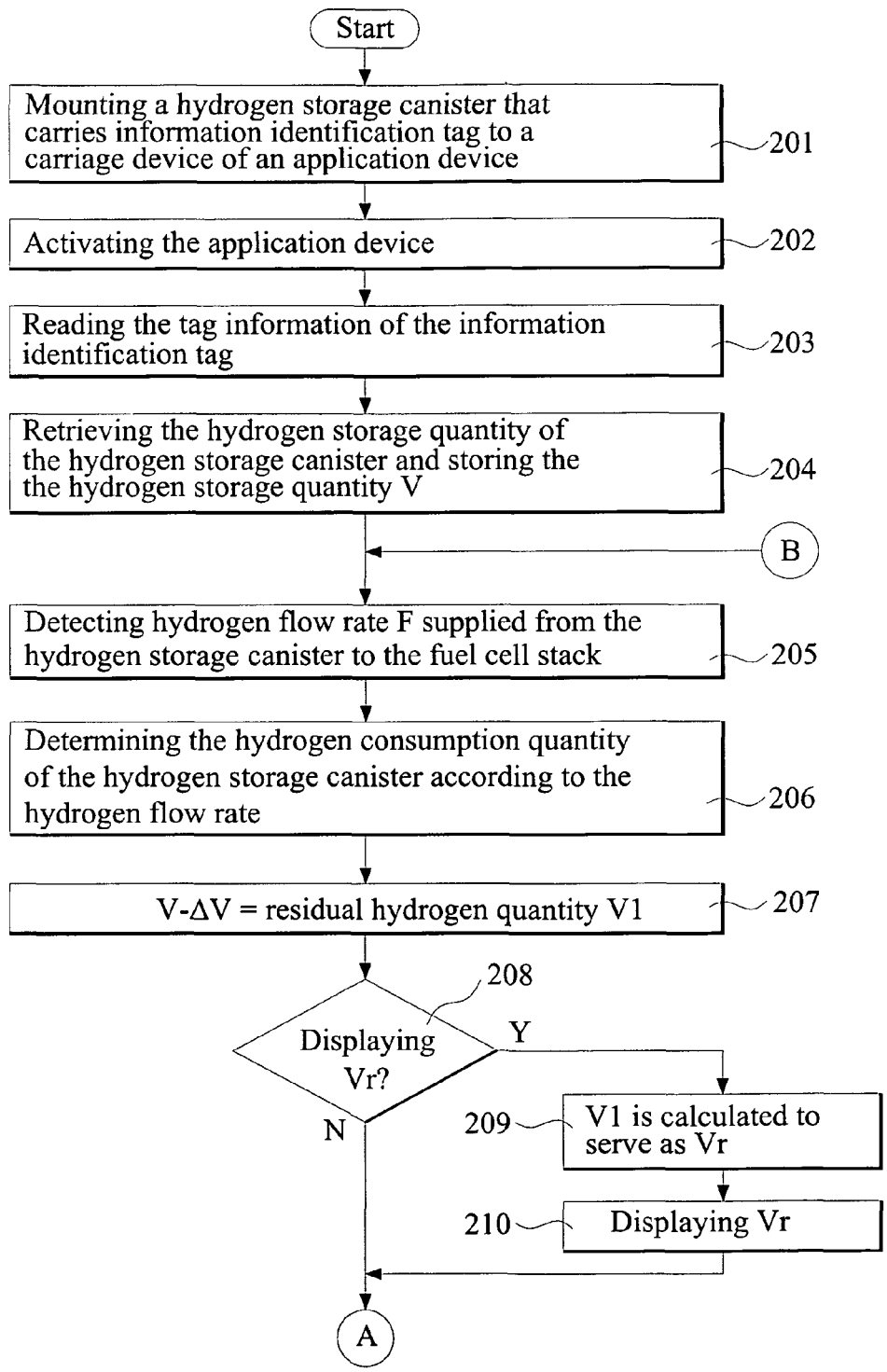
FIG. 4 shows a flow chart of a method according to a second operation mode of the present invention.
Figure 4B:
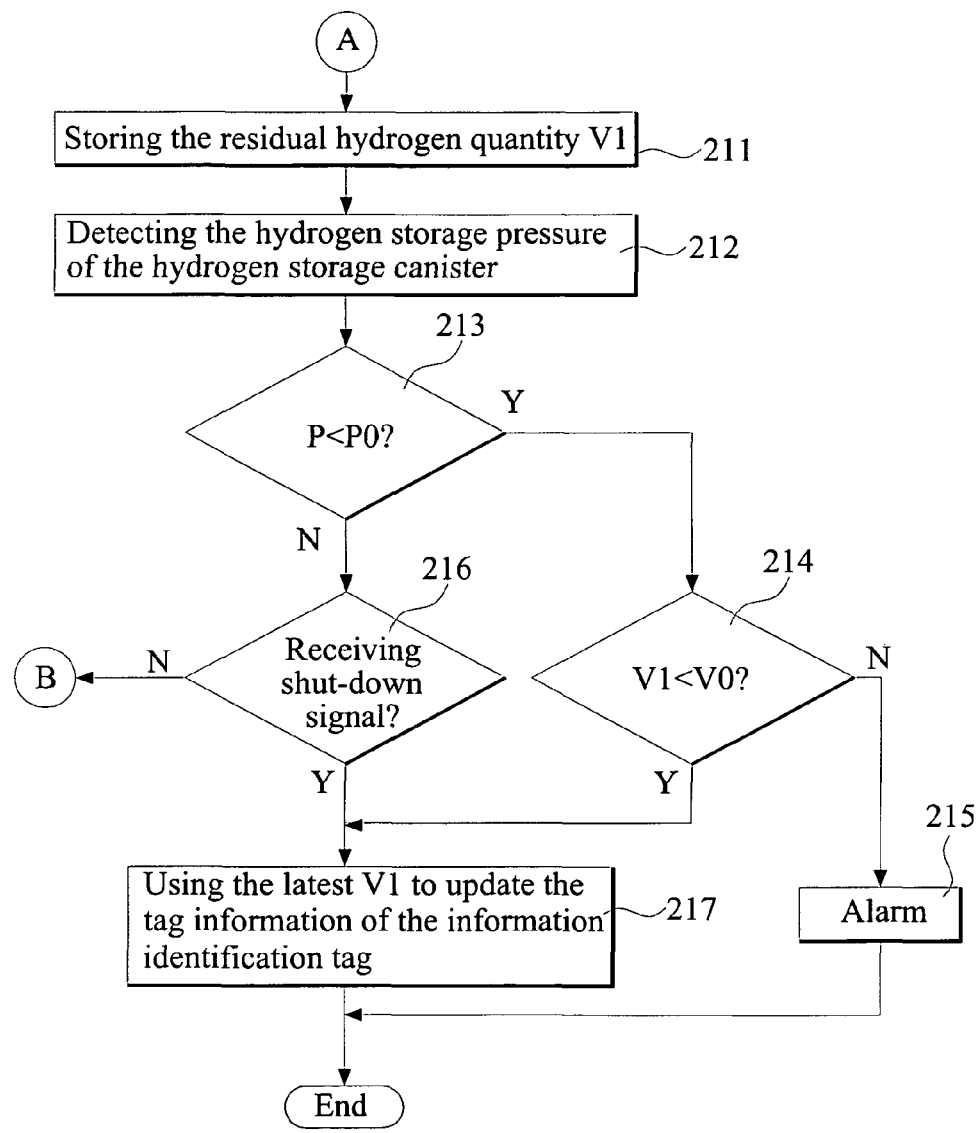

Referring to FIG. 4, which shows a flow chart of a method according to a second operation mode of the present invention, reference being also made to FIGS. 1 and 2, a hydrogen storage canister 3 that carries an information identification tag 5 is first mounted to an application device (Step 201). The application device is then activated (Step 202) to put the fuel cell system 100 into operation and the hydrogen storage canister 3 starting supply of hydrogen to the fuel cell stack 1. Then, the tag read/write device 6 reads the tag information 531 from the memory unit 53 of the information identification tag 5 (Step 203) to retrieve the hydrogen storage quantity V of the hydrogen storage canister 3 and stores the hydrogen storage quantity to the hydrogen quantity storage section 441 of the memory unit 44 (Step 204).

Next, acquirement is made for the hydrogen consumption quantity $\Delta V$ supplied from the hydrogen storage canister 3. In the instant embodiment, the flow meter 46 is employed to directly detect the hydrogen flow rate F supplied from the hydrogen storage canister 3 to the fuel cell stack 1 (Step 205), and the result of detection is transmitted through the analog-to-digital converter 461 to the processor unit 41 to allow the processor unit 41 to calculate the hydrogen consumption quantity $\Delta V$ of the hydrogen storage canister 3 from the hydrogen flow rate F (Step 206). Afterwards, the processor unit 41 subtracts the hydrogen consumption quantity $\Delta V$ from the hydrogen storage quantity V, which is previously retrieved, to obtain the residual hydrogen quantity V1 that currently remains in the hydrogen storage canister 3 (Step 207).

Next, a determination is made whether to display a residual hydrogen percentage Vr of the hydrogen storage canister 3 (Step 208). When a user attempts to get aware of the residual hydrogen percentage Vr of the hydrogen storage canister 3, the processor unit 41 makes an operation to convert the residual hydrogen quantity V1 into the residual hydrogen percentage Vr (Step 209), and then transmits the residual hydrogen percentage Vr to the display unit 42 to be displayed thereon (Step 210).

The residual hydrogen quantity V1 so calculated is temporarily held in the register 43 (Step 211) for speeding up the operation of the subsequent processes. To verify if the residual hydrogen quantity V1 so calculated is correct, the pressure sensor 47 detects the hydrogen storage pressure P of the hydrogen storage canister 3 (Step 212), and the processor unit 41 compares the detected hydrogen storage pressure P with the hydrogen pressure threshold P0 contained in the memory unit 44 to determine if the hydrogen storage pressure P is lower than the hydrogen pressure threshold P0 (Step 213). When the hydrogen storage pressure P is lower than the hydrogen pressure threshold P0, a further determination is made if the residual hydrogen quantity V1 is lower than the hydrogen residue threshold V0 (Step 214).

When the residual hydrogen quantity V1 is found higher than the hydrogen residue threshold V0, it indicates an abnormal situation, such as leakage of the hydrogen storage canister 3, malfunctioning of control system, or other unexpected failure problems, occurs. The processor unit 41 then transmits a control signal S to the alarm unit 48, making the alarm unit 48 issue an alarm signal to notify a user (Step 215).

In case that the hydrogen storage pressure P is normal, the processor unit 41 determines if a shut-down signal is received (Step 216). If not, re-detection of the hydrogen flow rate F of the hydrogen storage canister 3 is repeatedly made. In case that a shut-down signal is received, the processor unit 41 transmits the calculated residual hydrogen quantity V1 to the tag read/write device 6, and the tag read/write device 6 uses the latest residual hydrogen quantity V1 to update the tag information 531 of the information identification tag 5 (Step 217) in order to keep the latest residual hydrogen quantity V1 in the information identification tag 5 for subsequent use.

Figure 5:
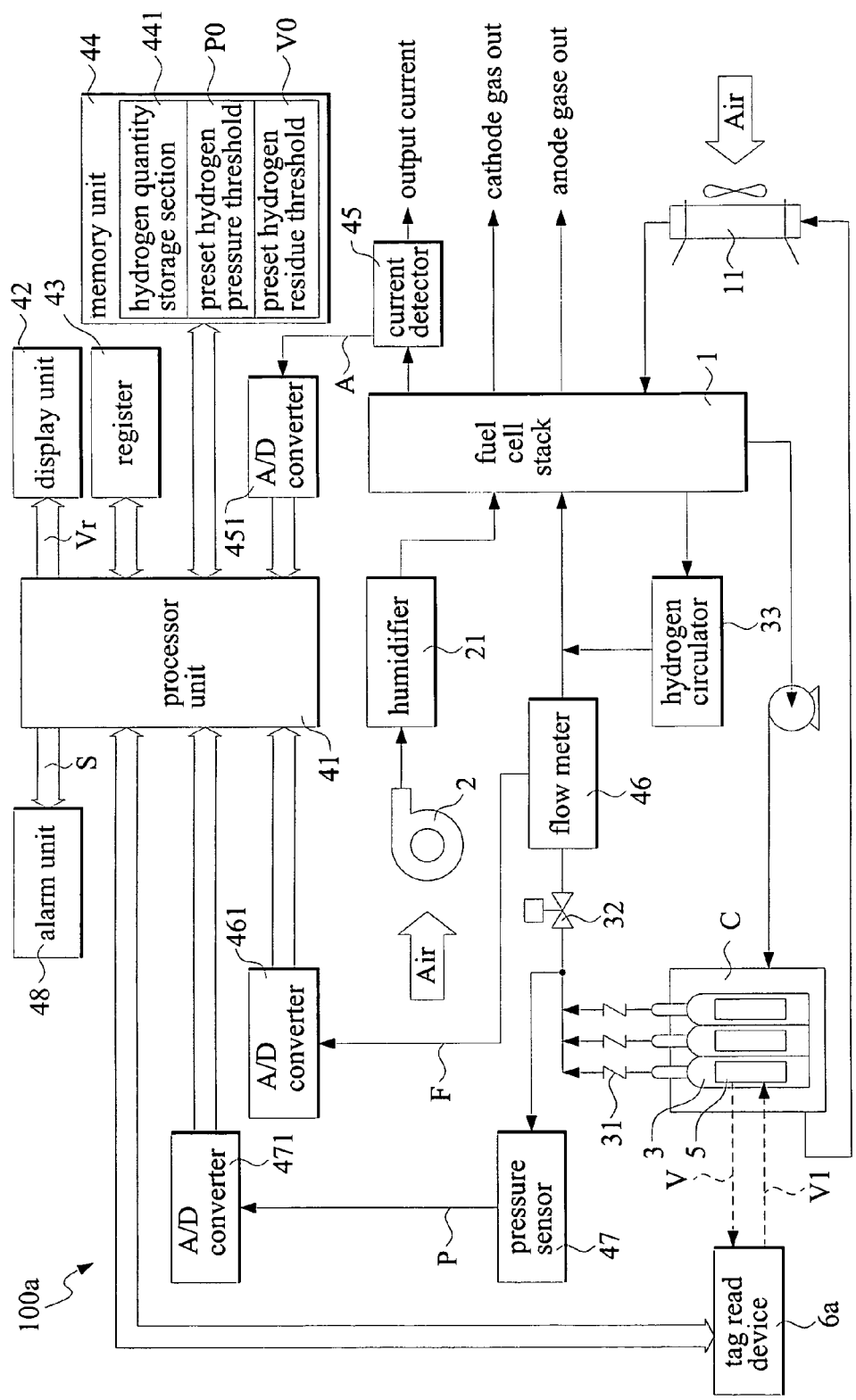
FIG. 5 is a system block diagram of another embodiment of the present invention.

FIG. 5 shows a system block diagram of another embodiment of the present invention. This embodiment is substantially identical to the previous one and identical components/parts/devices are labeled with the same reference numbers for correspondence. A difference between the embodiments is that in the instant embodiment, the hydrogen storage canister 3 of the fuel cell system 100a is provided with an information identification tag 5a that is readable but not writable.

The information identification tag 5a adopted in the instant embodiment is read-only RFID tag, which is readable by a tag read device 6a for retrieval of data. The information identification tag 5a may alternatively be a set of barcode or a readable/writable tag, provided it can be read. The tag read device 6a serving as a RFID device may thus be a barcode reader or an RFID reader that has a single function of reading.

Figure 6A:
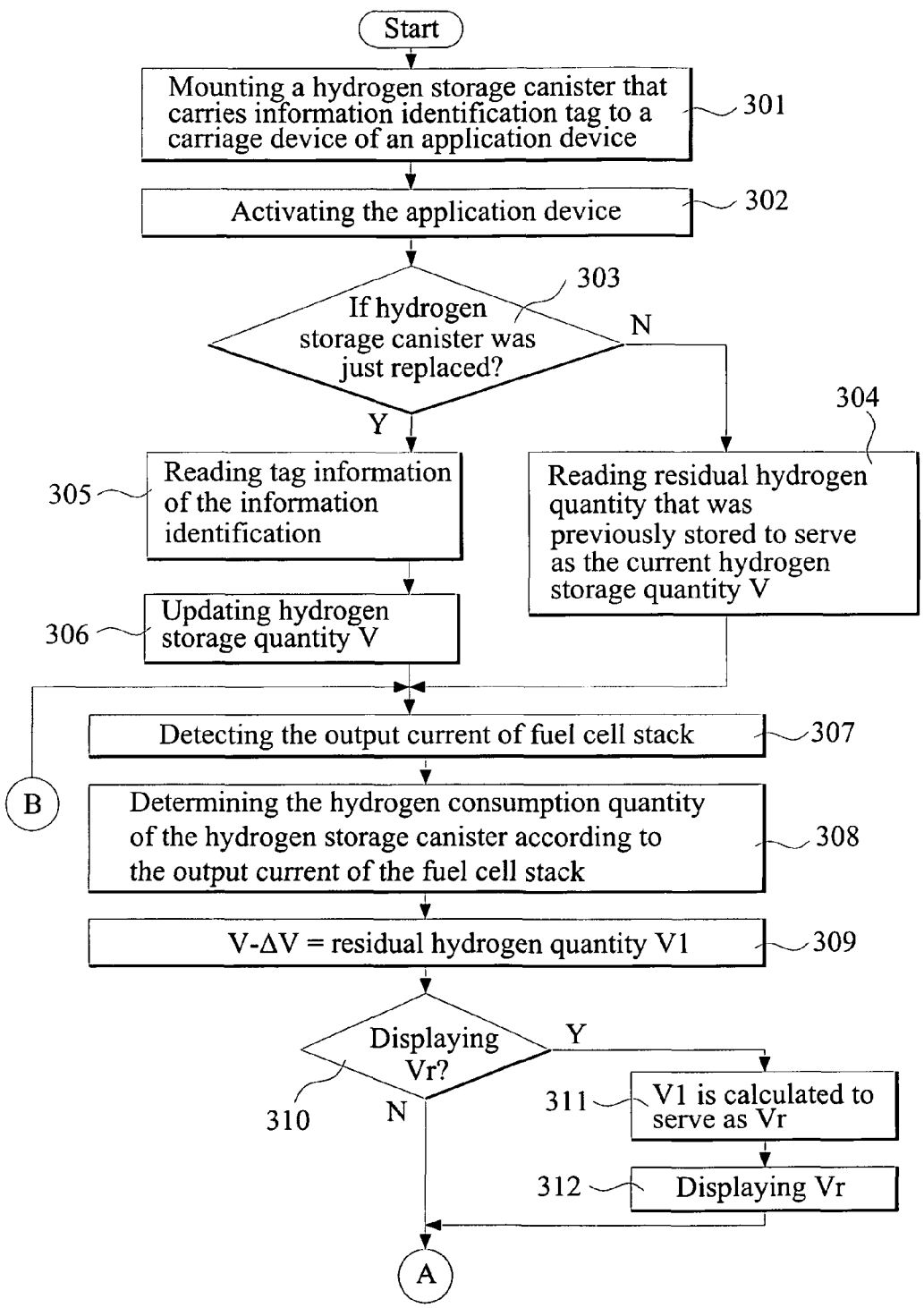
FIG. 6 shows a flow chart of a method according to third operation mode of the present invention.
Figure 6B:
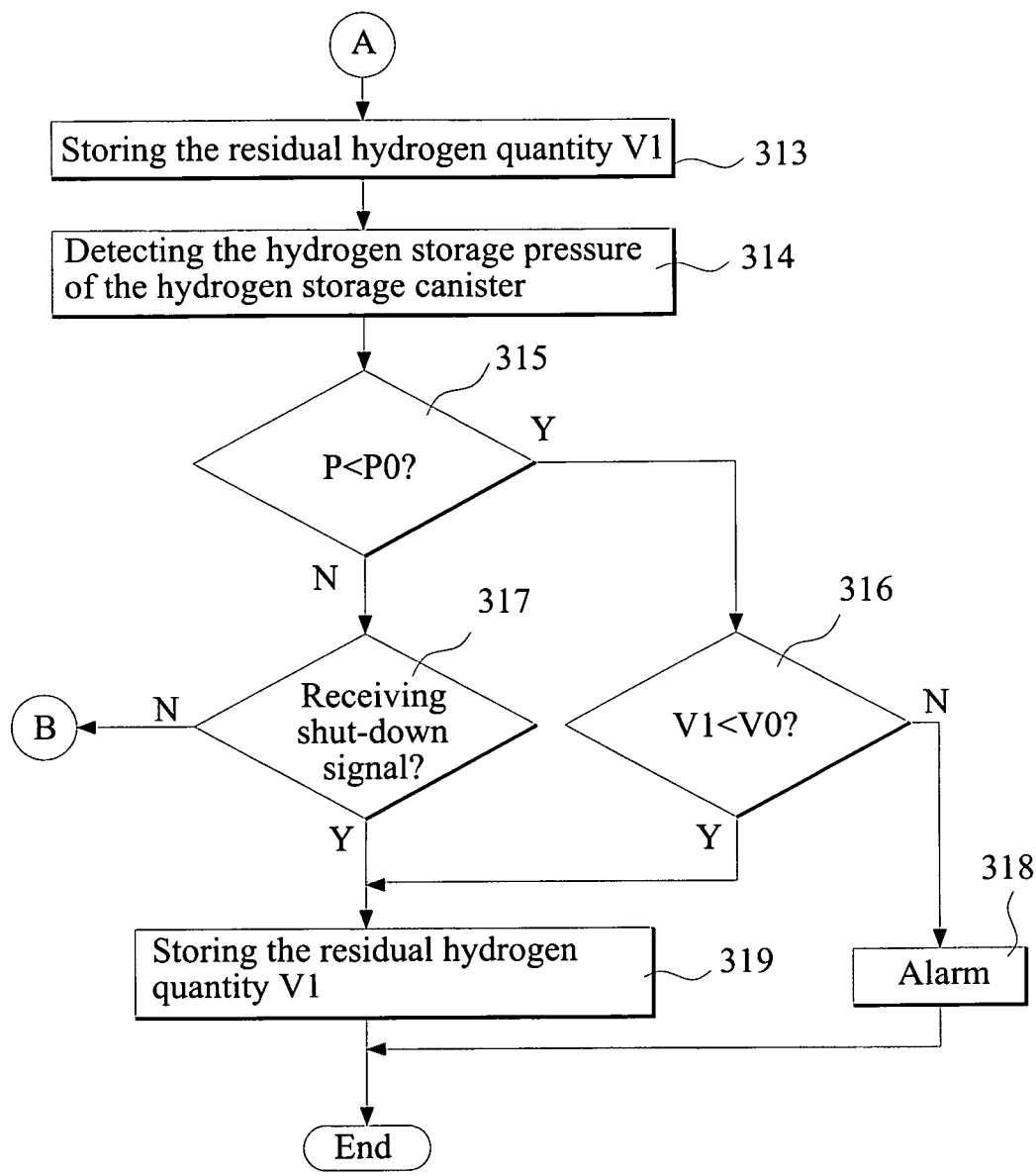

Referring to FIG. 6, which shows a flow chart of a method according to third operation mode of the present invention, reference being also made to FIG. 5, a hydrogen storage canister 3 that carries an information identification tag 5a is first mounted to an application device (Step 301), and then the application device is activated (Step 302) to put the fuel cell system 100a into operation and the hydrogen storage canister 3 starting supply of hydrogen to the fuel cell stack 1. Next, it is determined if the hydrogen storage canister 3 was just replaced (Step 303). If the hydrogen storage canister 3 was not just replaced, a record that was previously stored in the hydrogen quantity storage section 441 of the memory unit 44 would be retrievable, and the processor unit 41 may then read from the hydrogen quantity storage section 441 the residual hydrogen quantity that was previously stored to serve as the current hydrogen storage quantity V (Step 304).

If the hydrogen storage canister 3 was just replaced, the processor unit 41 uses the tag read device 6a to read the tag information of the information identification tag 5a (Step 305) in order to retrieve the hydrogen storage quantity V of the hydrogen storage canister 3 and then stores the hydrogen storage quantity V in the hydrogen quantity storage section 441 of the memory unit 44 to thereby update the hydrogen quantity storage section 441 by replacing the original contents thereof with the hydrogen storage quantity V (Step 306).

Next, the current detector 45 detects the output current A of the fuel cell stack 1 (Step 307) for calculation of the hydrogen consumption quantity $\Delta V$ of the hydrogen storage canister 3 from the output current A (Step 308). The hydrogen storage quantity V is then operated by subtracting the hydrogen consumption quantity $\Delta V$ therefrom to determine the residual hydrogen quantity V1 (Step 309).

Next, a determination is made if to display the residual hydrogen percentage Vr of the hydrogen storage canister 3 (Step 310). If a user attempts to get aware of the residual hydrogen percentage Vr of the hydrogen storage canister 3, the processor unit 41 converts the residual hydrogen quantity V1 into the residual hydrogen percentage Vr (Step 311), and transmits the residual hydrogen percentage Vr to the display unit 42 to be displayed thereon (Step 312).

The residual hydrogen quantity V1 so calculated is temporarily held in the register 43 (Step 313) for speeding up the operation of the subsequent processes. To verify if the residual hydrogen quantity V1 so calculated is correct, the pressure sensor 47 detects the hydrogen storage pressure P of the hydrogen storage canister 3 (Step 314), and the processor unit 41 compares the detected hydrogen storage pressure P with the hydrogen pressure threshold P0 contained in the memory unit 44 to determine if the hydrogen storage pressure P is lower than the hydrogen pressure threshold P0 (Step 315). When the hydrogen storage pressure P is lower than the hydrogen pressure threshold P0, a further determination is made if the residual hydrogen quantity V1 is lower than the hydrogen residue threshold V0 (Step 316).

When the residual hydrogen quantity V1 is found higher than the hydrogen residue threshold V0, it indicates an abnormal situation, such as leakage of the hydrogen storage canister 3, malfunctioning of control system, or other unexpected failure problems, occurs. The processor unit 41 then transmits a control signal S to the alarm unit 48, making the alarm unit 48 issue an alarm signal to notify a user (Step 318).

In case that the hydrogen storage pressure P is normal, the processor unit 41 determines if a shut-down signal is received (Step 317). If not, re-detection of the output current A of the fuel cell stack is repeatedly made. In case that a shut-down signal is received, since in the instant embodiment, the information identification tag 5a can only be read, the processor unit 41 instead stores the residual hydrogen quantity V1 in the hydrogen quantity storage section 441 of the memory unit 44 (Step 319) in order to keep the latest residual hydrogen quantity V1 in the hydrogen quantity storage section 441 for subsequent use.

Figure 7A:
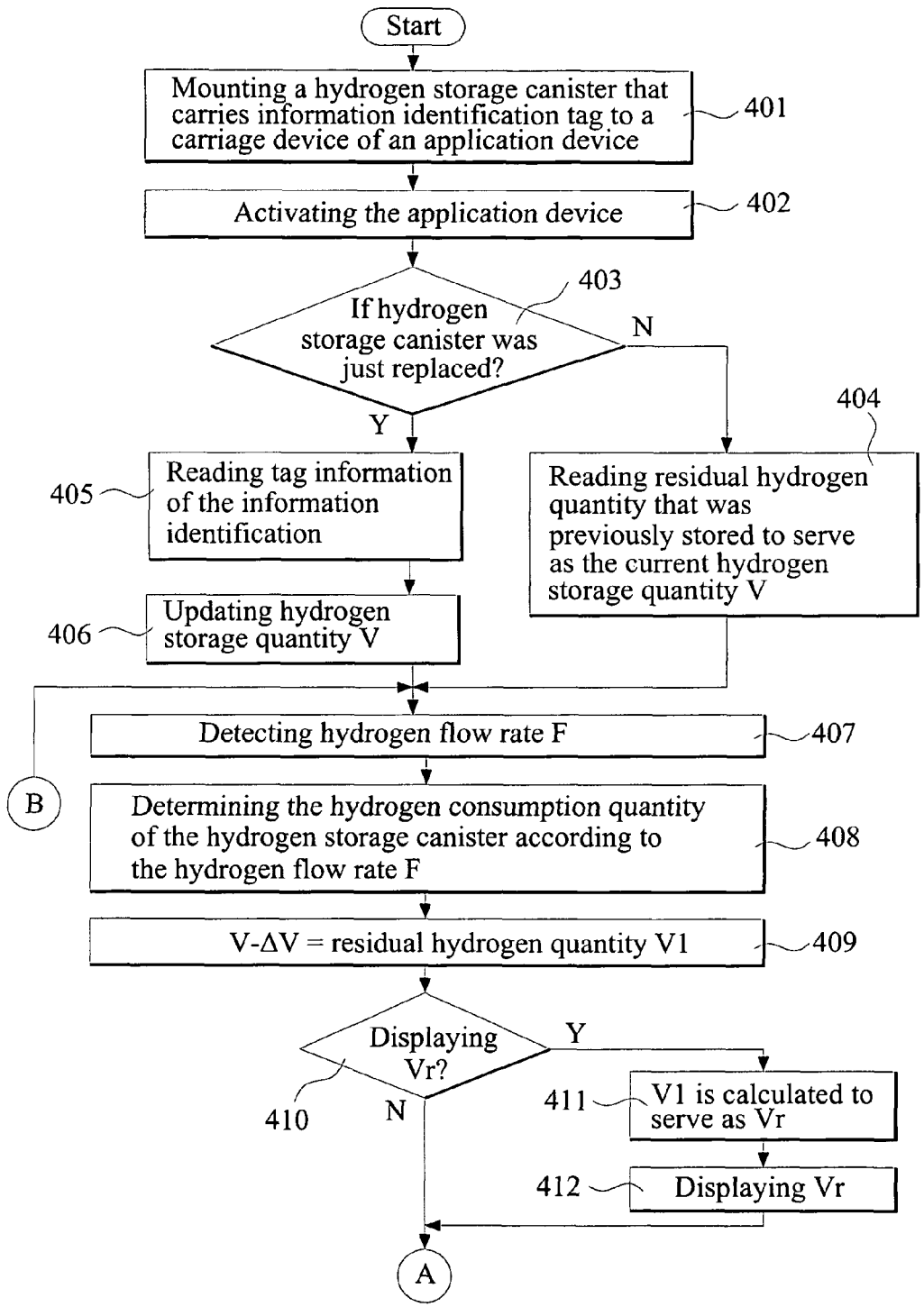
FIG. 7 shows a flow chart of a method according to a fourth operation mode of the present invention.
Figure 7B:
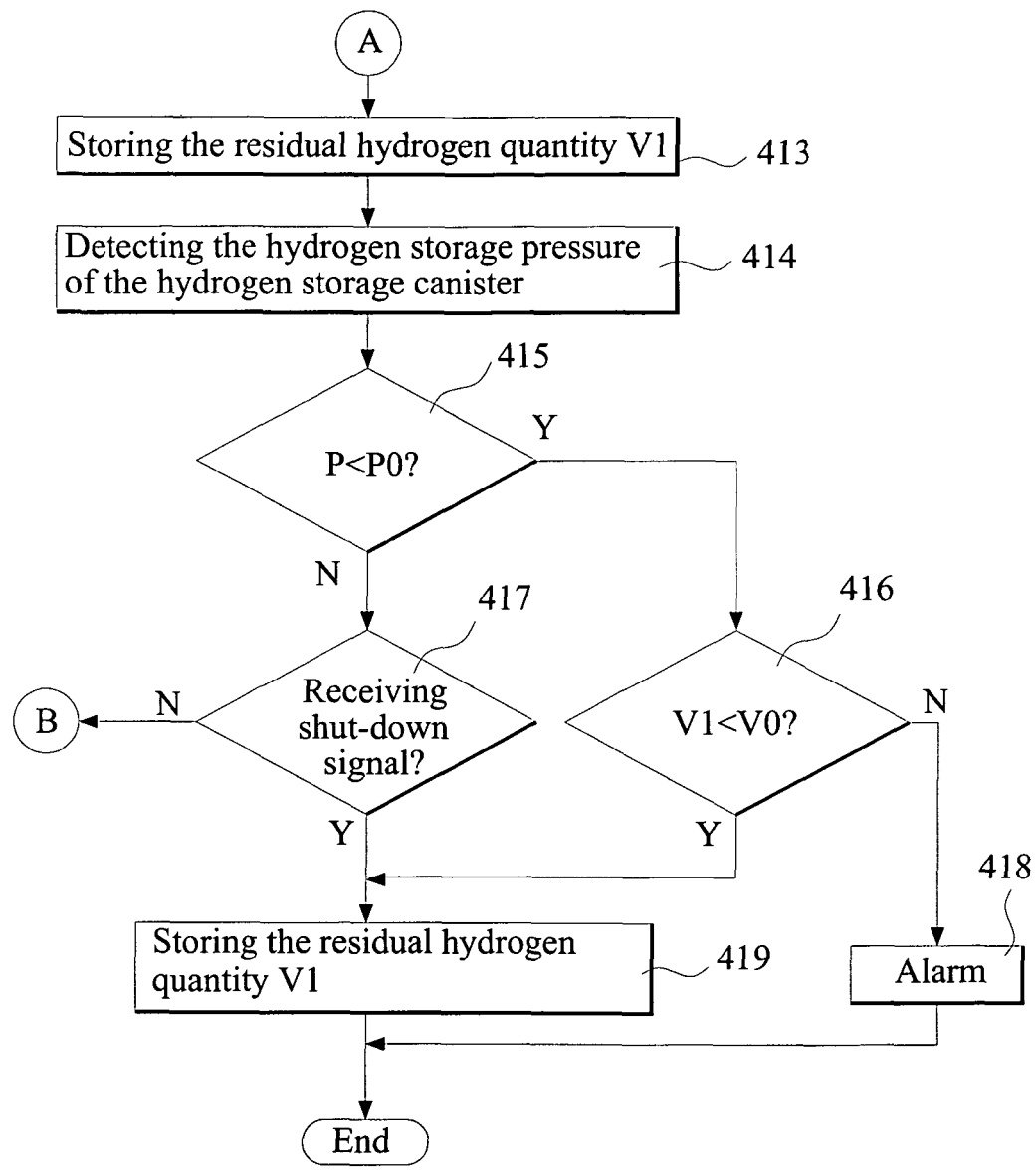

Referring to FIG. 7, which shows a flow chart of a method according to a fourth operation mode of the present invention, reference being also made to FIG. 5, a hydrogen storage canister 3 that carries an information identification tag 5a is first mounted to an application device (Step 401). The application device is then activated (Step 402) to put the fuel cell system 100a into operation and the hydrogen storage canister 3 starting supply of hydrogen to the fuel cell stack 1. Then, it is determined if the hydrogen storage canister 3 was just replaced (Step 403). If the hydrogen storage canister 3 was not just replaced, a record that was previously stored in the hydrogen quantity storage section 441 of the memory unit 44 would be retrievable, and the processor unit 41 may then read from the hydrogen quantity storage section 441 the residual hydrogen quantity that was previously stored to serve as the current hydrogen storage quantity V (Step 404).

If the hydrogen storage canister 3 was just replaced, the processor unit 41 uses the tag read device 6a to read the tag information of the information identification tag 5a (Step 405) in order to retrieve the hydrogen storage quantity V of the hydrogen storage canister 3 and then stores the hydrogen storage quantity V in the hydrogen quantity storage section 441 of the memory unit 44 to thereby update the hydrogen quantity storage section 441 by replacing the original contents thereof with the hydrogen storage quantity (Step 406).

Next, the flow meter 46 is used to directly detect the hydrogen flow rate F supplied from the hydrogen storage canister 3 to the fuel cell stack 1 (Step 407) for calculation of the hydrogen consumption quantity $\Delta V$ of the hydrogen storage canister 3 from the hydrogen flow rate F (Step 408). The hydrogen storage quantity V is then operated by subtracting the hydrogen consumption quantity $\Delta V$ therefrom to determine the residual hydrogen quantity V1 (Step 409).

Next, a determination is made if to display the residual hydrogen percentage Vr of the hydrogen storage canister 3 (Step 410). If a user attempts to get aware of the residual hydrogen percentage Vr of the hydrogen storage canister 3, the processor unit 41 converts the residual hydrogen quantity V1 into the residual hydrogen percentage Vr (Step 411), and transmits the residual hydrogen percentage Vr to the display unit 42 to be displayed thereon (Step 412).

The residual hydrogen quantity V1 so calculated is temporarily held in the register 43 (Step 413) for speeding up the operation of the subsequent processes. To verify if the residual hydrogen quantity V1 so calculated is correct, the pressure sensor 47 detects the hydrogen storage pressure P of the hydrogen storage canister 3 (Step 414), and the processor unit 41 compares the detected hydrogen storage pressure P with the hydrogen pressure threshold P0 contained in the memory unit 44 to determine if the hydrogen storage pressure P is lower than the hydrogen pressure threshold P0 (Step 415). When the hydrogen storage pressure P is lower than the hydrogen pressure threshold P0, a further determination is made if the residual hydrogen quantity V1 is lower than the hydrogen residue threshold V0 (Step 416).

When the residual hydrogen quantity V1 is found higher than the hydrogen residue threshold V0, it indicates an abnormal situation, such as leakage of the hydrogen storage canister 3, malfunctioning of control system, or other unexpected failure problems, occurs. The processor unit 41 then transmits a control signal S to the alarm unit 48, making the alarm unit 48 issue an alarm signal to notify a user (Step 418).

In case that the hydrogen storage pressure P is normal, the processor unit 41 determines if a shut-down signal is received (Step 417). If not, re-detection of the hydrogen flow rate F of the hydrogen storage canister 3 is repeatedly made. In case that a shut-down signal is received, the residual hydrogen quantity V1 is stored in the hydrogen quantity storage section 441 of the memory unit 44 (Step 419) in order to keep the latest residual hydrogen quantity V1 in the hydrogen quantity storage section 441 for subsequent use.

Although the present invention has been described with reference to the best modes for carrying out the present invention, it is apparent to those skilled in the art that a variety of modifications and changes may be made without departing from the scope of the present invention which is intended to be defined by the appended claims.

What is claimed is:

1. A method for measuring remaining hydrogen capacity of hydrogen storage canister by applying tag information, wherein at least one hydrogen storage canister is provided for supplying hydrogen to support a reaction in an application device, the hydrogen storage canister comprising an information identification tag, which stores at least one record of tag information indicating a hydrogen storage quantity of the hydrogen storage canister, the method comprising following steps:

(a) reading the tag information from the information identification tag;

(b) detecting a hydrogen consumption quantity supplied from the hydrogen storage canister;

(c) subtracting the hydrogen consumption quantity from the hydrogen storage quantity to calculate a residual hydrogen quantity;

(c1) detecting a hydrogen storage pressure of the hydrogen storage canister;

(c2) determining if the hydrogen storage pressure is lower than a preset hydrogen pressure threshold;

(c3) determining if the residual hydrogen quantity is lower than a preset hydrogen residue threshold, when the hydrogen storage pressure is lower than the hydrogen pressure threshold, for determination of correctness of the residual hydrogen quantity;

(c4) issuing an alarm when the residual hydrogen quantity is higher than the hydrogen residue threshold but the hydrogen storage pressure is lower than the hydrogen pressure threshold; and (d) updating the tag information of the information identification tag by replacing the tag information with the residual hydrogen quantity so calculated.

2. The method as claimed in claim 1 further comprising, before step (a), a step of mounting the hydrogen storage canister to the application device.

3. The method as claimed in claim 1, wherein in step (b), the hydrogen consumption quantity of the hydrogen storage canister is determined according to an output current generated by the reaction of the application device.

4. The method as claimed in claim 1, wherein in step (b), the hydrogen consumption quantity is determined according to hydrogen flow rate that is supplied from the hydrogen storage canister to the application device.

5. The method as claimed in claim 1 further comprising, after step (c), a step of displaying the residual hydrogen quantity and the hydrogen storage quantity.

6. The method as claimed in claim 1, wherein the application device comprises one of a stationary electrical power supply system, a portable electrical power supply system, and a transportation vehicle.

7. A method for measuring remaining hydrogen capacity of hydrogen storage canister by applying tag information, wherein at least one hydrogen storage canister is provided for supplying hydrogen to support a reaction in an application device, the hydrogen storage canister comprising an information identification tag, which stores at least one record of tag information indicating a hydrogen storage quantity of the hydrogen storage canister, the method comprising following steps:

(a) reading the tag information from the information identification tag;

(b) detecting a hydrogen consumption quantity supplied from the hydrogen storage canister;

(c) subtracting the hydrogen consumption quantity from the hydrogen storage quantity to calculate a residual hydrogen quantity;

(c1) detecting a hydrogen storage pressure of the hydrogen storage canister;

(c2) determining if the hydrogen storage pressure is lower than a preset hydrogen pressure threshold;

(c3) determining if the residual hydrogen quantity is lower than a preset hydrogen residue threshold, when the hydrogen storage pressure is lower than the hydrogen pressure threshold, for determination of correctness of the residual hydrogen quantity;

(c4) issuing an alarm when the residual hydrogen quantity is higher than the hydrogen residue threshold but the hydrogen storage pressure is lower than the hydrogen pressure threshold: and (d) storing the residual hydrogen quantity so calculated.

8. The method as claimed in claim 7 further comprising, before step (a), a step of mounting the hydrogen storage canister to the application device.

9. The method as claimed in claim 7, wherein in step (b), the hydrogen consumption quantity of the hydrogen storage canister is determined according to an output current generated by the reaction of the application device.

10. The method as claimed in claim 7, wherein in step (b), the hydrogen consumption quantity is determined according to hydrogen flow rate that is supplied from the hydrogen storage canister to the application device.

11. The method as claimed in claim 7 further comprising, after step (c), a step of displaying the residual hydrogen quantity and the hydrogen storage quantity.

12. The method as claimed in claim 7, wherein the application device comprises one of a stationary electrical power supply system, a portable electrical power supply system, and a transportation vehicle.

* * * * *